United States Patent [19]
Downing et al.

[11] 3,818,067
[45] June 18, 1974

[54] PREPARATION OF ORGANIC DINITRILES

[75] Inventors: Roland G. Downing, Orange, Tex.;
Leon S. Scott, Wilmington, Del.;
William C. Seidel, Orange, Tex.

[73] Assignee: E. I. duPont de Nemours and Company, Wilmington, Del.

[22] Filed: July 20, 1972

[21] Appl. No.: 273,801

[52] U.S. Cl. .................................. 260/465.8 R
[51] Int. Cl. .................................. C07c 121/04
[58] Field of Search .......................... 260/465.8 R

[56] References Cited
UNITED STATES PATENTS

| | | | |
|---|---|---|---|
| 3,496,215 | 2/1970 | Drinkard et al. | 260/465.8 R |
| 3,496,217 | 2/1970 | Drinkard et al. | 260/465.8 R |
| 3,652,641 | 3/1972 | Druliner | 260/465.8 R |

*Primary Examiner*—Joseph P. Brust

[57] ABSTRACT

An improved process is provided for the production of organic dinitriles such as adiponitrile by reaction of hydrogen cyanide with an organic mononitrile such as 3-pentenenitrile or 4-pentenenitrile in the presence of a zerovalent nickel complex by carrying out the hydrocyanation under the conditions that the molar ratio of nitrile moieties to the nickel complex is maintained below about 10/1.

10 Claims, No Drawings

PREPARATION OF ORGANIC DINITRILES

BACKGROUND OF THE INVENTION

The hydrocyanation of olefins to organic nitriles using certain zerovalent nickel complexes as catalyst has been described in a number of U.S. patents including U.S. Pat. Nos. 3,497,215 and 3,496,217. Products obtained by the processes described therein include organic mononitriles such as 3-pentenenitrile or 4-pentenenitrile as well as dinitriles such as adiponitrile, methylglutaronitrile and ethylsuccinonitrile. In general, mixtures of these nitriles are obtained. An important commercial objective is to obtain the highly important polyamide intermediate, adiponitrile, in high yield. Accordingly, means for attaining this objective have continued to be sought.

STATEMENT OF THE INVENTION

It has now been found that organic dinitriles, in particular adiponitrile, can be obtained in high yield from the hydrocyanation of an organic mononitrile such as 3-pentenenitrile or 4-pentenenitrile in the presence of an appropriate zerovalent nickel complex by controlling the concentration of the organic mononitrile reactant and organic dinitrile product in the reaction medium with respect to the concentration of the zerovalent nickel complex. One technique is to adjust the feeding rate of the mononitrile to the reaction medium and to remove the organic dinitrile as it is formed. Best results are obtained by maintaining the mole ratio of the combined nitrile moieties of the mononitrile and dinitrile to zerovalent nickel complex below about 10/1. More specifically, control of the concentration of organic nitrile with respect to the nickel complex can be effected by feeding of the organic mononitrile to the reaction medium at a controlled rate and removing the organic mononitrile from the reaction medium by one or more of the following: (1) separation of the reactant and product nitriles from the nickel complex by diffusion through an appropriate membrane, (2) precipitation of the nitriles as metal complexes, and (3) distillation of the nitriles from the nickel complex. Of these, separation of the organic nitriles from the nickel complex by reverse osmosis through a membrane is a preferred technique. The separation of organic nitriles from various homogeneous catalysts by reverse osmosis with certain aromatic polyamide and polyimide membranes is described in detail in commonly owned Gosser patent application U.S. Pat. Ser. No. 273,803 (CR-7257), filed on even date herewith.

Membranes suitable for the separation of the organic nitriles from the catalyst complexes such as those of zero-valent nickel include those consisting of polymers having recurring imide or amide groups as mentioned above, those having recurring hydrazide groups as described in U.S. Pat. No. 3,567,632, issued to Richter and Hoehn as well as the aromatic polyimides disclosed in commonly owned Alegranti patent application U.S. Pat. Ser. No. 273,805 (CR-7170) also filed on even date herewith. Of these membranes comprising essentially asymetric aromatic polymers having recurring

groups in the polymer chain, those having recurring imide groups are preferred, especially those which are prepared from pyromellitic dianhydride and 4,4'-aminodiphenyl ether.

The nickel complexes used in the hydrocyanation reaction are of the formulae $Ni(PXYZ)_4$, wherein PXYZ represents a neutral ligand wherein X is OR, Y and Z are of the class consisting of R and OR, and R is an aryl group having up to 18 carbon atoms, wherein the R groups of a given PXYZ ligand may be cojoined, and may be the same or different.

An especially preferred class of R groups include

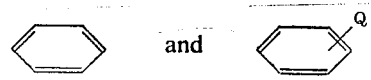

where Q is Cl, $OCH_3$ and $CH_3$. If desired, as noted above, any of the R groups may be cojoined where possible. Preferred neutral ligands include aryl phosphites such as triphenylphosphite, tri(m- and p-chlorophenyl)phosphite, and tri(m- and p-tolyl)phosphites as well as mixtures thereof.

The hydrocyanation and separation can be carried out concomitantly or step-wise as desired, and can be done batchwise or continuously, the main consideration being that the hydrocyanation is carried out in such a way as to maintain a low concentration of organic nitrile moieties at the reaction site with respect to concentration of the nickel complexes.

Along with the catalyst complexes described above, certain promoters can be used in the hydrocyanation to activate the catalysts. The promoter is generally a compound containing a cation of a metal of the class consisting of zinc, cadmium, beryllium, aluminum, gallium, indium, silver, titanium, zirconium, hafnium, germanium, tin, vanadium, niobium, scandium, chromium, molybdenum, tungsten, manganese, rhenium, palladium, thorium, erbium, iron and cobalt or mixtures thereof. The anion portion of the compound is preferably selected from the class consisting of halide, i.e., fluoride, chloride, bromide and iodide; anions of lower fatty acids of from 2 to 7 carbon atoms, $HPO_3^{-2}$, $H_2PO_2^-$, $CF_3COO^-$, $OSO_2C_7F_{15}^-$ and $SO_4^{-2}$. In many instances it is advantageous to have an excess of certain neutral ligands present with respect to the nickel complex. The preferred excess ligands are the aryl phosphites wherein the aryl groups contain up to 18 carbon atoms. In general, excess ligands are present in at least a two-molar excess over that required in the nickel complex. The excess ligand used may be the same or different from the ligand attached to the nickel in the nickel complex fed to the reactor.

The hydrocyanation reactions can be carried out with or without a solvent. The reaction can be carried out at a temperature in the range of −25° to 200° C. with a range of 0°–150° C. being preferred. The hydrocyanation can be conveniently run at atmospheric pressure. A pressure of 0.05 to 10 atmospheres is preferred, but a pressure range as broad as 0.05 to 100 atmospheres can be used if desired.

DESCRIPTION OF PREFERRED EMBODIMENTS

EXAMPLE 1 — EFFECT OF NITRILE CONTENT ON ADIPONITRILE YIELD

A reactor was charged with 9.3 g. of tetrakis-(p-tritolyl)phosphite nickel(O) catalyst in toluene solution (1 mmole), 0.14 g. of $ZnCl_2$ and 5.6 g. p-tritolylphosphite. The reactor temperature was held by thermostat at 60° C. and a mixture of 1.5 HCN/1.0 3-pentenenitrile was fed to the reactor at a rate of 1 mmole/minute. An analysis of the dinitriles produced as a function of conversion showed an initial yield of adiponitrile of 95 percent which decreased as a function of the increase in nitrile/nickel ratio to a value of 85 percent adipo-nitrile at a nitrile/nickel ratio of 68.

EXAMPLE 2 — ORGANIC NITRILE LEVEL CONTROLLED BY MEMBRANE SEPARATION

A. Hydrocyanation

A catalyst solution was prepared in a nitrogen atmosphere from (a) 115 ml of a 49.5 percent solution of $NiL_4$ in L where L is a mixed (tri(m- and p-tolyl)phosphite, (b) 4.35 ml. of 3-pentenenitrile and (c) a freshly prepared and filtered solution of 8.0 g. of anhydrous $SnCl_2$ in 25 ml. of dry tetrahydrofuran. The apparatus in which the above described catalyst solution was prepared consisted of a 500 ml. 3-neck round bottom flask fitted with serum stoppers and a pressure release tube attached to a mercury bubbler. A slight nitrogen pressure was applied and the flask was warmed in a 90° C. oil bath. A solution of HCN in 3-pentenenitrile (1:1) was added to the magnetically stirred catalyst solution with a syringe pump at 0.25 ml/min. until 7.6 ml. had been added. The tip of the inlet was under the surface of the catalyst solution. Gas chromatographic analysis showed the final mixture to contain 2.71 weight percent of $C_5$ nitriles and 3.94 weight percent of $C_6$ dinitriles, adiponitrile (ADN), methylglutaronitrile (MGN) and ethylsuccinonitrile (ESN) with about 90 percent of the dinitriles being adiponitrile.

B. Membrane Separation

The apparatus consisted of a commercial Amicon 420 stainless steel reverse osmosis cell. This was used as supplied except that a $2\mu$ pore Rigi Mesh stainless steel disc was used to support the membrane. The membrane area of the cell was 6.1 square inches. The cell is functionally similar to the test cell described in FIG. 1 of U.S. Pat. No. 3,567,632.

An asymmetric polyimide membrane was prepared starting with a 20 percent solids solution of the polyamic acid from pyromellitic dianhydride and 4,4'-diaminodiphenyl ether in dimethylacetamide, following the method of W. R. Sorenson and T. W. Campbell "Preparative Methods of Polymer Chemistry," 2nd Ed., Interscience Publishers, 1968, pp. 170–171. This solution was diluted to 10 percent polyamic acid by addition of anhydrous dimethylacetamide and 10 percent (by weight of polyamic acid) of cetylpyridinium bromide was dissolved therein. A 20-mil film of this solution was cast on a glass plate under a doctor knife. The assembly was immersed in a bath containing 95 ml. acetic anhydride and 140 ml. triethylamine dissolved in 500 ml. benzene. The bath was then heated at about 65°–70° C. for 15 minutes. The assembly was then washed successively at room temperature in benzene and in ethanol containing 2 percent benzene. In the latter wash the membrane was detached from the glass. The membrane was then washed in water and air-dried.

The membrane prepared as described above was soaked in adiponitrile at room temperature for 2 days and then mounted in the cell described above. The cell was tested for nickel rejection by placing in it a solution of 5 g. of the $NiL_4$ complex described in (A) above in 35 ml. of tetrahydrofuran. Nitrogen pressure was applied and about 25 ml. of the test solution was forced through the membrane. A qualitative nickel test showed that the membrane had good nickel selectivity. The cell was emptied and the hydrocyanation reaction mixture described under (A) above was then poured into the cell with 25 ml. of tetrahydrofuran used to rinse the flask. The permeation cell was warmed to about 60° C. and a pressure of 1,500 psi of nitrogen was admitted to the cell. In five hours 20 ml. of permeate was collected. The cell temperature was increased to 70° C. and an additional 25 ml. of tetrahydrofuran was added and the nitrogen pressure set at 1,400 psi. In 6 hours an additional 43 ml. of permeate was collected. The permeate samples were combined, mixed and weighed (75 g.). Analysis by X-ray fluorescence showed that the nickel concentration in the permeate was less than 3 percent of that in the hydrocyanation reaction mixture. It also indicated that the $SnCl_2$ concentration in the permeate was approximately the same as in the reaction mixture while the phosphorus concentration was about half as great as in the reaction mixture. Gas chromatographic analysis confirmed that about 50 volume percent of the permeate was tricresylphosphite. The gas chromatographic analysis showed that the permeate contained 2.58 weight percent of $C_5$ nitriles and 5.7 weight percent of $C_6$ nitriles (adiponitrile, methylglutaronitrile and ethyl-succinonitrile). Similar analysis showed the residual feed solution to contain 0.8 weight percent of $C_5$ nitriles and 1.39 weight percent of the $C_6$ nitriles with adiponitrile comprising about 90 percent of the 3-dinitriles.

C. Hydrocyanation with Recovered Catalyst

The material remaining in the permeation cell at the end of the separation procedure described in Part B was poured into a flask as used in Part A. The tetrahydrofuran was evaporated under reduced pressure leaving 75 g. of pale yellow grease. A filtered solution of 4 g. $SnCl_2$ in 15 ml. tetrahydrofuran was added as was 25 ml. of tricresylphosphite. The apparatus was arranged as in Part A except that the tip of the inlet tube was not below the liquid surface. An equimolar solution of HCN in 3-pentenenitrile was added at 4 ml./hr. for 1 hour (4.0 ml.). Gas chromatographic analysis showed the reaction mixture to contain 0.49 weight percent $C_5$ nitriles and 2.92 weight percent $C_6$ dinitriles with adiponitrile 91 percent of the $C_6$ dinitriles.

D. Membrane Separation

The apparatus described in Part B was used with the same membrane in place. The reaction mixture from Part C was placed in the cell with 30 ml. additional tetrahydrofuran. The cell was warmed to 70° C. and 1,500 psi $N_2$ was admitted. The cell temperature then increased to about 85° C. and remained at approximately that temperature during most of the experiment. When 40 ml. of permeate had been collected 20 ml. of tetrahydrofuran was added to the feed. An additional 12 ml. of permeate was collected and 25 ml. more tetrahydrofuran was added. A final 30 ml. of permeate was collected and the permeate samples were combined, mixed, and weighed (70 g.). Gas chromatographic analysis showed that the permeate contained 0.40 weight percent $C_5$ nitriles and 3.38 weight percent $C_6$ dinitriles with adiponitrile being 91 percent of the dinitriles. The residual feed solution (ca. 82 g.) was similarly shown to contain only traces of $C_5$ nitriles and 1.19 weight percent $C_6$ dinitriles with adiponitrile being 91 percent of the dinitriles.

Nickel analysis by atomic absorption showed that the nickel content of the permeate was only about 10 percent of that in the feed.

E. Continuous Permeation and Hydrocyanation

Following in general the procedure described in Section A a catalyst solution was prepared in a nitrogen atmosphere from (a) 150 ml. of $NiL_4$ in L (49.5 weight percent) where L is a mixed tri(m- and p-tolyl)phosphite, (b) 1.40 ml. of 3-pentenenitrile (3-PN) and (c) a filtered solution of 10 g. of $SnCl_2$ in 70 ml. of tetrahydrofuran (THF).

The stirred solution was warmed in a 75° C. oil bath and 1:1 HCN–3PN was added at 4 ml./hr. until 7.0 ml. had been added. A 6 ml. sample of the resulting solution was withdrawn for analysis. Gas chromatographic analysis showed 4.60 weight percent $C_6$ dinitriles with 96 percent as adiponitrile (ADN). An additional 70 ml. THF was added and 90 ml. of the resulting mixture was withdrawn. Analysis of a portion of this solution showed 3.09 weight percent $C_6$ dinitriles (96 percent ADN). A permeator loop was then connected to the reaction flask by means of small tubes inserted through rubber septums. The permeator loop contained a test cell as described by Richter and Hoehn (U.S. Pat. No. 3,567,632) modified by the insertion of a $2\mu$ pore size Rigi Mesh support for the membrane and the replacement of the original permeate collector with a simple 1/16 inch stainless steel tube. A polyimide membrane similar to that described in Section B was mounted in the cell. The loop also contained a pump, a pressure regulator, and gauges. Syringe pumps for addition of HCN·3PN and catalyst make-up solution were also connected to the reaction flask.

At the start of operation of the permeator the system thus contained ca. 100 ml. of $L_4Ni$ in L solution and ca. 4.7 ml. of HCN·3PN had been added. (Both the amount of nickel and the amount of HCN·3PN were reduced by the volume adjustment.)

The oil bath was kept at ca. 70°–80° C. and the permeation cell was kept at 65°–85° C. during 5 days of operation. The test cell pressure was ca. 2,000 psi throughout. The HCN·3PN solution was added continuously at rates of 0.06 to 0.36 ml./hr. as needed to maintain the reactor concentration. The addition of THF, $L_4Ni$ in L, and $SnCl_2$ was carried out as necessary during the run to maintain the ca. 200 ml. initial liquid volume and replace ingredients lost through the membrane. During part of the run this addition of make-up solutions was continuous, but at other times adjustments were made by injections with syringes. During the course of the experiment, four ca. 6 ml. samples of the reactor solution were withdrawn for analysis. The permeate was also collected for analysis.

A summary of the experiment is tabulated below:
Total HCN·3PN added: 28.1 ml.
Total make-up volume added: 300 ml. comprising 39 ml. $L_4Ni$ in L, 16 g. $SnCl_2$, 58 ml. L, remainder THF
Approx. total nickel used: 3 g.
Permeate: 258 g. comprising 11.9 g. D.N.'s (94 percent ADN) and 4.6 g. PN's
Residual reaction mixture: 189 g. comprising 4.03 g. D.N.'s (91.5 percent ADN) and 1.08 g. PN's Total DN's produced: 16.2 g.
Average distribution: 93.3 percent ADN
Nickel rejection: 60–90 percent by X-ray fluorescence and qualitative nickel tests.

ADDITIONAL LEGEND

D.N. — dinitrile
P.N. — pentenenitrile
ADN — adiponitrile

F. Control-Hydrocyanation at High Nitrile Concentration

The catalyst solution was prepared as in Part A with the following quantities:
a. 19 ml. of $NiL_4$ in L, as defined in Part A
b. 0.20 ml. 3-pentenenitrile
c. 1.4 g. $SnCl_2$ in 5 ml. tetrahydrofuran (filtered)

The oil bath was set at 80° C. and a solution of HCN in 3-pentenenitrile was added with a syringe pump at ca. 4 ml./hr. Samples of 3 ml. each were withdrawn at intervals for analysis. Gas chromatographis analysis gave the following results.

| ml. HCN·3PN added | Wt. % $C_5$ Nitriles | Wt. % ADN | ADN / (ADN + ESN + MGN) |
|---|---|---|---|
| 1 | 1.14 | 3.42 | 0.98 |
| 2 | 2.37 | 4.62 | 0.93 |
| 4 | 2.73 | 8.18 | 0.86 |
| 22.5 | 9.95 | 27.95 | 0.74 |

EXAMPLE 3 — ORGANIC NITRILE LEVEL CONTROLLED BY PRECIPITATION

A reactor was charged with 20 ml. of a mixed tritolylphosphite solution of zerovalent nickel complex containing 1.575 percent nickel with a molar ratio of tritolylphosphite-to-nickel of 10/1 and 20 ml. of mixed tritolylphosphite solution and maintained at 40° C. The mixed tritolylphosphite was made by reacting $PCl_3$ with a mixture comprising predominantly meta- and para-cresols. A solution of HCN/3PN/$ZnCl_2$ comprising 24.8 g. of HCN, 75.6 g. of 3PN and 75 g. of $ZnCl_2$ was fed to the reactor until a thick slurry was formed. The white solids were filtered, washed with benzene and analyzed for adiponitrile. The analysis showed that 15 cycles of dinitriles were produced with the distribution being 93 percent adiponitrile.

EXAMPLE 4 — ORGANIC NITRILE LEVEL CONTROLLED BY DISTILLATION

A reactor was charged with 30 ml. of tetrakistri-(m- and p-tolyl)phosphite nickel(O) complex in excess tritolylphosphite (TTP/Ni = 8), 1.0 g. of $ZnCl_2$ and 30 cc. of toluene. A 1/1 molar ratio of HCN/3PN was added for six cycles of hydrocyanation. The product adiponitrile was vacuum distilled along with the toluene solvent after which the reactor was recharged with toluene; HCN, 3PN and $ZnCl_2$ were fed in slowly and the product adiponitrile again distilled. This process was repeated seven times. An analysis of the distilled product showed 40 cycles of dinitriles produced with 88 percent of the dinitriles being adiponitrile.

We claim:

1. In a process of producing organic dinitriles in a reaction medium by reaction of hydrogen cyanide with an organic mononitrile of the group consisting of 3-pentenenitrile and 4-pentenenitrile in the presence of a zerovalent nickel complex of the formula $Ni(PXYZ)_4$, wherein X is OR, Y and Z are of the group consisting of R and OR and R is an aryl radical containing up to 18 carbon atoms, at a temperature in the range of $-25°$ to $200°$ C. and at a pressure in the range of about 0.05 to 100 atmospheres and recovering organic dinitriles, the improvement which comprises feeding the organic mononitrile to the reaction medium at a controlled rate and by removing organic dinitriles from the reaction medium as they are formed, the rate of feeding and rate of removal being such that the mole ratio of the combined mononitrile and dinitrile moieties to the zerovalent nickel complex in the reaction medium is maintained below a value of about 10/1.

2. The process of claim 1 wherein in addition to the zerovalent nickel complex $Ni(PXYZ)_4$ there is present at least two moles of the ligand PXYZ per mole of $Ni(PXYZ)_4$, X, Y and Z being defined as in claim 1.

3. The process of claim 2 wherein there is present in addition to the $Ni(PXYZ)_4$ as a promoter a cation of a metal of the group consisting of zinc, cadmium, beryllium, aluminum, gallium, indium, silver, titanium, zirconium, hafnium, germanium, tin, vanadium, niobium, scandium, chromium, molybdenum, tungsten, manganese, rhenium, palladium, thorium, erbium, iron and cobalt or mixtures thereof.

4. The process of claim 3 wherein the organic nitriles are removed from the reaction medium by diffusion of the nitriles through a membrane, the membrane consisting essentially of an asymmetric aromatic polymer having recurring

groups in the polymer chain.

5. The process of claim 4 wherein the promoter is a cation of tin.

6. The process of claim 5 wherein the aromatic polymer has recurring imide groups.

7. The process of claim 6 wherein the aromatic polymer is prepared from pyromellitic dianhydride and 4,4'-diaminodiphenyl ether.

8. The process of claim 3 wherein the organic nitriles are removed from the reaction medium by precipitation of the nitriles as metal complexes with a cation of a metal of the class set forth in claim 3.

9. The process of claim 8 wherein the metal is zinc.

10. The process of claim 3 wherein the organic nitriles are removed from the reaction medium by distillation.

* * * * *